(12) United States Patent
Mei-Dan et al.

(10) Patent No.: US 12,533,166 B2
(45) Date of Patent: Jan. 27, 2026

(54) ORTHOPEDIC NAIL SYSTEM

(71) Applicant: MDS II LLC, Boulder, CO (US)

(72) Inventors: Omer Mei-Dan, Boulder, CO (US); Jacob Segil, Boulder, CO (US)

(73) Assignee: MDS II LLC, Boulder, CO (US)

( * ) Notice: Subject to any disclaimer, the term of this patent is extended or adjusted under 35 U.S.C. 154(b) by 104 days.

(21) Appl. No.: 18/390,593

(22) Filed: Dec. 20, 2023

(65) Prior Publication Data

US 2024/0122632 A1   Apr. 18, 2024

Related U.S. Application Data

(63) Continuation-in-part of application No. 18/116,519, filed on Mar. 2, 2023.

(60) Provisional application No. 63/316,109, filed on Mar. 3, 2022.

(51) Int. Cl.
*A61B 17/72* (2006.01)
*A61B 17/68* (2006.01)
*A61B 17/00* (2006.01)

(52) U.S. Cl.
CPC ...... *A61B 17/7241* (2013.01); *A61B 2017/00477* (2013.01); *A61B 2017/681* (2013.01)

(58) Field of Classification Search
CPC .............. A61B 17/7241; A61B 17/72
See application file for complete search history.

(56) References Cited

U.S. PATENT DOCUMENTS

| | | | |
|---|---|---|---|
| 5,489,284 A | 2/1996 | James | |
| 5,658,287 A * | 8/1997 | Hofmann | A61B 17/7241 606/63 |
| 5,961,553 A | 10/1999 | Coty et al. | |
| 9,161,790 B2 | 10/2015 | Kuxhaus et al. | |
| 2011/0230883 A1 | 9/2011 | Zahrly et al. | |
| 2012/0330313 A1 * | 12/2012 | Grady | A61B 17/7225 606/64 |
| 2015/0305791 A1 * | 10/2015 | Purohit | A61B 17/8872 606/96 |

(Continued)

FOREIGN PATENT DOCUMENTS

| | | |
|---|---|---|
| CN | 204708960 | 10/2015 |
| CN | 107736930 | 9/2019 |

(Continued)

*Primary Examiner* — Tessa M Matthews
(74) *Attorney, Agent, or Firm* — Brownstein Hyatt Farber Schreck, LLP

(57) ABSTRACT

Embodiments are directed to an orthopedic nail that includes a collar having a sidewall defining a first opening extending from the first end to the second end along a first axis of the collar, a second opening configured to engage with an orthopedic fastener, first engagement features positioned at the first end of the first opening, and second engagement features positioned at a second end of the first opening. The orthopedic nail can include a shaft defining a third opening positioned adjacent to the first end of the shaft and configured to allow the orthopedic fastener to pass through the shaft, and third engagement features positioned between the third opening and a second end of the shaft. The third engagement features can be configured to rotationally couple to the second engagement features. The orthopedic nail can include a locking mechanism that is configured to couple to the engagement features.

20 Claims, 15 Drawing Sheets

(56) References Cited

U.S. PATENT DOCUMENTS

| | | |
|---|---|---|
| 2016/0296260 A1 | 10/2016 | Venturini |
| 2018/0071105 A1 | 3/2018 | Orbay |
| 2018/0353227 A1 | 12/2018 | Kuxhaus |
| 2023/0349409 A1 | 11/2023 | Verhaegh |

FOREIGN PATENT DOCUMENTS

| | | |
|---|---|---|
| CN | 215688341 | 2/2022 |
| WO | WO 2016/089324 | 6/2016 |
| WO | WO 2016/131094 | 8/2016 |

\* cited by examiner

ORTHOPEDIC NAIL SYSTEM

CROSS-REFERENCE TO RELATED APPLICATION

This application is a continuation in part of U.S. patent application Ser. No. 18/116,519 filed on Mar. 2, 2023, and titled "Orthopedic Nail System" which is a nonprovisional patent application of and claims the benefit under 35 U.S.C. § 119(e) of U.S. Provisional Patent Application No. 63/316,109, filed Mar. 3, 2022, and titled "Orthopedic Nail System", the contents of which are incorporated herein by reference in its entirety.

FIELD

The described embodiments relate generally to medical devices for treating orthopedic fractures including tooling which allows for rational adjustment. More particularly, the present embodiments relate to an orthopedic device for treating long bone fractures including femoral, tibia and humerus fractures.

BACKGROUND

Large bone fractures, such as femur fractures, typically need to be treated quickly to stabilize the fractured bone and prevent further injury. In some cases, a femur facture or other fracture is treated using intramedullary nailing to align and stabilize the broken bone. A femoral nail is placed in the center of the femur and screws are used to attach the bone to the femoral nail, which stabilizes the bone while it heals. Misalignment of broken femur sections can occur during an intermedullary nailing procedure or other procedures (e.g., hip replacement, knee replacement, and so on), which may create complications for the patient. For example, misalignment of sections of the femur can result in accelerated joint wear, arthritis, increased muscle strain, and/or other issues. These types of complications may not be noticed until after the femoral fracture has healed making them difficult to correct.

SUMMARY

Embodiments are directed to an orthopedic nail that includes a collar having a sidewall extending from a first end to a second end and defining. The sidewall can defined a first opening extending from the first end to the second end along a first axis of the collar, a second opening configured to engage with an orthopedic fastener, first engagement features positioned at the first end of the first opening, and second engagement features positioned at a second end of the first opening. The orthopedic nail can include a shaft extending from a first end to a second end. The shaft defining a third opening positioned adjacent to the first end of the shaft and configured to allow the orthopedic fastener to pass through the shaft, and third engagement features positioned between the third opening and a second end of the shaft. The third engagement features can be configured to rotationally couple to the second engagement features. When the third engagement features are coupled to the second engagement features the first end of the shaft is positioned in the first opening of the collar and the third opening is aligned with the second opening. The orthopedic nail can include a locking mechanism that is configured to couple to the engagement features. In a first state, the locking mechanism can prevent movement of the collar with respect to the shaft, and in a second state allow movement of the collar with respect to the shaft.

Embodiments are directed to an orthopedic fixation device that includes a collar extending along an axis from a first end to a second end. The collar can define first engagement features positioned at the first end, second engagement features positioned at the second end, and a first opening extending through a side of the collar and configured to allow an orthopedic fastener to extend through the collar. The orthopedic fixation device can include a shaft extending from a first end to a second end and defining third engagement features configured engage with the second engagement features to couple the shaft to the collar and allow the shaft to rotate with respect to the collar. The shaft can also define a second opening positioned proximate to the first end and configured to align with the first opening and allow the orthopedic fastener to extend through the shaft, when the shaft is coupled to the collar. The orthopedic fixation device can include a locking mechanism configured to engage with the first engagement features and the shaft to selectively prevent rotation of the collar with respect to the shaft.

Embodiments include an orthopedic fixation system that includes a nail and an alignment tool. The nail can include a collar defining first engagement features, second engagement features, and a first opening configured to couple with an orthopedic screw. The nail can include a shaft configured to couple with the collar and rotate with respect to the collar. The shaft can define third engagement features configured to couple to the first engagement features and allow the shaft to rotate with respect to the collar and second opening that aligns with the first opening when the shaft is coupled to the collar. The nail can include a lock that is configured to selectively fix the collar with respect to the shaft. The alignment tool can include a first portion that couples to the first end of the collar the first portion configured to align an orthopedic fastening tool with the lock.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
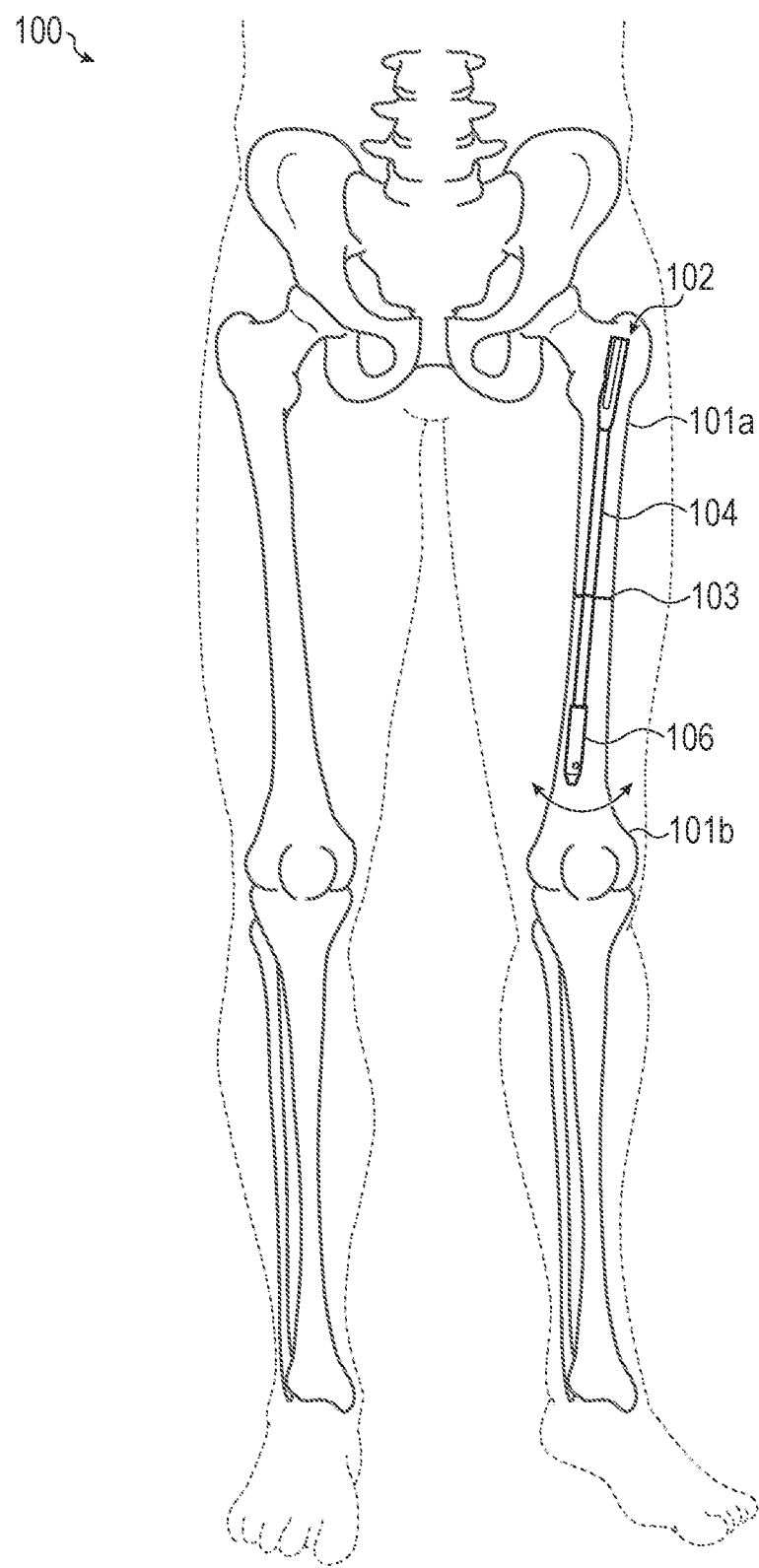
FIG. 1A shows an example of a femoral nail in a first configuration stabilizing a distal portion of the femur in a first rotational position.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to an orthopedic nail, and an associated system, that can be used to treat orthopedic fractures. The orthopedic nail system can be used to change an alignment of a fractured bone after the orthopedic nail has been coupled to the bone. The orthopedic nail system can include an orthopedic nail that is placed within an intramedullary of a bone, for example using intramedullary fixation techniques during a first procedure. The orthopedic nail can include a first component that is fixed to a first portion of the bone on one side of a fracture and a second component that is fixed to a second portion of the bone on another side of the fracture. After the orthopedic nail is coupled to the bone, the relative orientation of the first and second components of the orthopedic nail can be adjusted after fixation, which can change the alignment of the first portion of the bone with respect to the second portion of the bone. The later procedure can be used to improve an alignment of the different portions of the fractured bone, which may help improve surgical outcomes. Certain examples herein describe the nail as a "femoral nail" for use with a femur, but it should be understood that any discussion of a femoral nail may broadly apply to an orthopedic nail for use with any other bone.

In the case of a long-bone fracture, an initial surgical procedure to align and stabilize the bone typically is performed relatively quickly to prevent further injury. In some cases, the initial procedure may be done in an emergency or urgent setting and different portions of the fractured bone may not be aligned as accurately as desired, due to the speed with which the initial procedure is performed. Misalignment, including rotational misalignment, may cause the bone to heal poorly or in such a way that a patient's use of a limb or other body portion is limited or different than it was prior to the fracture.

In some cases, it can be difficult to secure the different portions of a broken bone in the correct orientation while fixing an intermedullary device to the broken bone. The type, location, and/or complexity of a fracture can make it difficult to achieve the correct orientation of the different bone portions. For example, a surgeon may need to secure multiple bone portions in a desired orientation while inserting and securing a traditional fixed intramedullary device to the bone. Once a traditional intramedullary device has been secured, the relative orientations of the different broken bone portions may be fixed. Accordingly, the aligning, securing and fixing of the intramedullary device is generally done all at the same time, which can complicate the procedure and/or result in misalignment of different bone portions.

The orthopedic fixation system described herein can include a multi-part orthopedic nail for intramedullary fixation of a fractured bone. In some cases, the multi-part orthopedic nail can be a femoral nail for fixing femoral fractures including femoral shaft fractures. The multi-part orthopedic nail (also referred to herein as a "femoral nail") can include a shaft and a collar that are coupled together. The shaft can be coupled to a first portion of a fractured bone on a first side of the fracture and the collar can be coupled to a second portion of the fractured bone on a second side of the fracture. For simplicity of illustration, the examples discussed herein may refer to bone fractures in which a bone is broken into two segments. However, the devices and techniques described herein can be applied to fractures in which a bone is broken into more than two parts. For example, the shaft and/or collar may include multiple fixation sites along each of their respective lengths that allow different fractured seconds of the bone to be coupled to the orthopedic nail. In other cases, the orthopedic nail may include multiple shaft and/or collar segments which can be attached to different pieces of a fractured bone. For example, an orthopedic mail may have a shaft with collars positioned on each end of the shaft.

After the shaft and collar are fixed to different portions of the fractured bone, the collar can be moved with respect to the shaft to change a relative orientation of the different bone portions while implanted in the bone. For example, the collar can be rotated with respect to the shaft to change an axial alignment of the first bone portion with respect to the second bone portion. In some cases, the collar and shaft may be configured to rotate with respect to each other about an axis of the shaft. In other cases, the collar and the shaft may rotate and translate with respect to each other, which may allow a bone to be distracted to permanently or temporarily increase a length of the bone.

The femoral nail can include a lock that can selectively fix the collar with respect to the shaft to prevent relative movement of the collar with respect to the shaft. In a first state, the lock may allow a relative position of the collar and shaft to be adjusted to change an alignment of the first bone portion with respect to the second bone portion. In a second state, the lock may fix the collar with respect to the shaft to prevent relative movement of these components, which can prevent movement of the first bone portion with respect to the second bone portion. Accordingly, the femoral nail described herein can be used to change an alignment of different bone portions after being placed and secured within a broken femur. The selective realignment can facilitate an improved alignment of the different bone portions at a later time. For example, selective realignment of the femur may allow a distal portion of the femur, knee, ankle, and foot to be realigned with respect to a hip joint, which may improve patient outcomes, such as by improving joint wear as compared to the initial alignment when the device is first secured to the bone.

In some cases, the orthopedic nail system can include an alignment tool that is used to set a position of the collar with respect to the shaft while the femoral nail is secured within the femur of a patient. The alignment tool can couple to the shaft and/or the collar and/or include a gauge to indicate a current position of the collar with respect to the shaft. For example, the alignment tool may indicate a rotational orientation of the collar with respect to the shaft. The alignment tool may also include a locking mechanism that aligns a tool for engaging and/or disengaging the lock. The locking mechanism can allow a user to locate the lock from outside the patient's body and guide a tool to engage with the lock while the nail is inside the patient. Accordingly, a user can disengage the lock and change a position of the second portion of the user's femur with respect to a first portion of the user's femur. Once the desired orientation of the second femur portion is achieved, the lock can be engaged to fix the collar with respect to the shaft to prevent relative movement of these components and stabilize the femur in the desired location. The repositioning of a user's femur portions (or other bone) may occur during the same surgical operation that was used to place and secure the femoral nail within the femur. In other cases, repositioning of the user's femur portions may occur after the initial placement procedure, for example, in a separate procedure at a later time.

The examples discussed herein are in the context of a femoral fracture, however these concepts can be applied to other types of fractures including fractures in other leg bones, such as a tibia or fibula, fractures in an arm, such as humerus fractures, or other types of orthopedic fractures. Additionally, the examples described and shown herein are in the context of antegrade femoral nailing, however the devices and concepts described herein can be applied to other surgical procedures including retrograde intramedullary nailing techniques. The devices and systems described herein may also be used for joint replacement procedures including hip replacement procedures. For example, the devices and systems described herein may be used in a hip replacement procedure to adjust a torsion angle between a stem of the implant and the femoral head. The devices and systems may allow adjustment of the torsion angle during surgery to achieve a desired alignment of the hip with other joints (e.g., the knee joint).

These and other embodiments are discussed below with reference to FIGS. 1A-8. However, those skilled in the art will readily appreciate that the detailed description given herein with respect to these Figures is for explanatory purposes only and should not be construed as limiting.

FIG. 1A shows an example of a patient 100 with a femoral nail 102 stabilizing a fractured femur 101 in a first configuration. In the example shown in FIG. 1A, the femur 101 has a fracture 103 that separates a first femur portion 101a from a second femur portion 101b. The femoral nail 102 can be inserted and coupled to the femur 101 using traditional intramedullary fixation techniques. The femoral nail 102 can include a shaft 104 and a collar 106 that is coupled to the shaft 104. During insertion of the femoral nail 102, the shaft 104 and collar 106 may be rigidly coupled together, for example by a lock as described herein. The shaft 104 can be coupled to the first femur portion 101a and the collar 106 can be coupled to the second femur portion 101b using typical fixations techniques including the use of one or more orthopedic screws. Once secured to the bone, the femoral nail 102 fixes the position of the first femur portion 101a with respect to the second femur portion 101b.

Figure 1B:
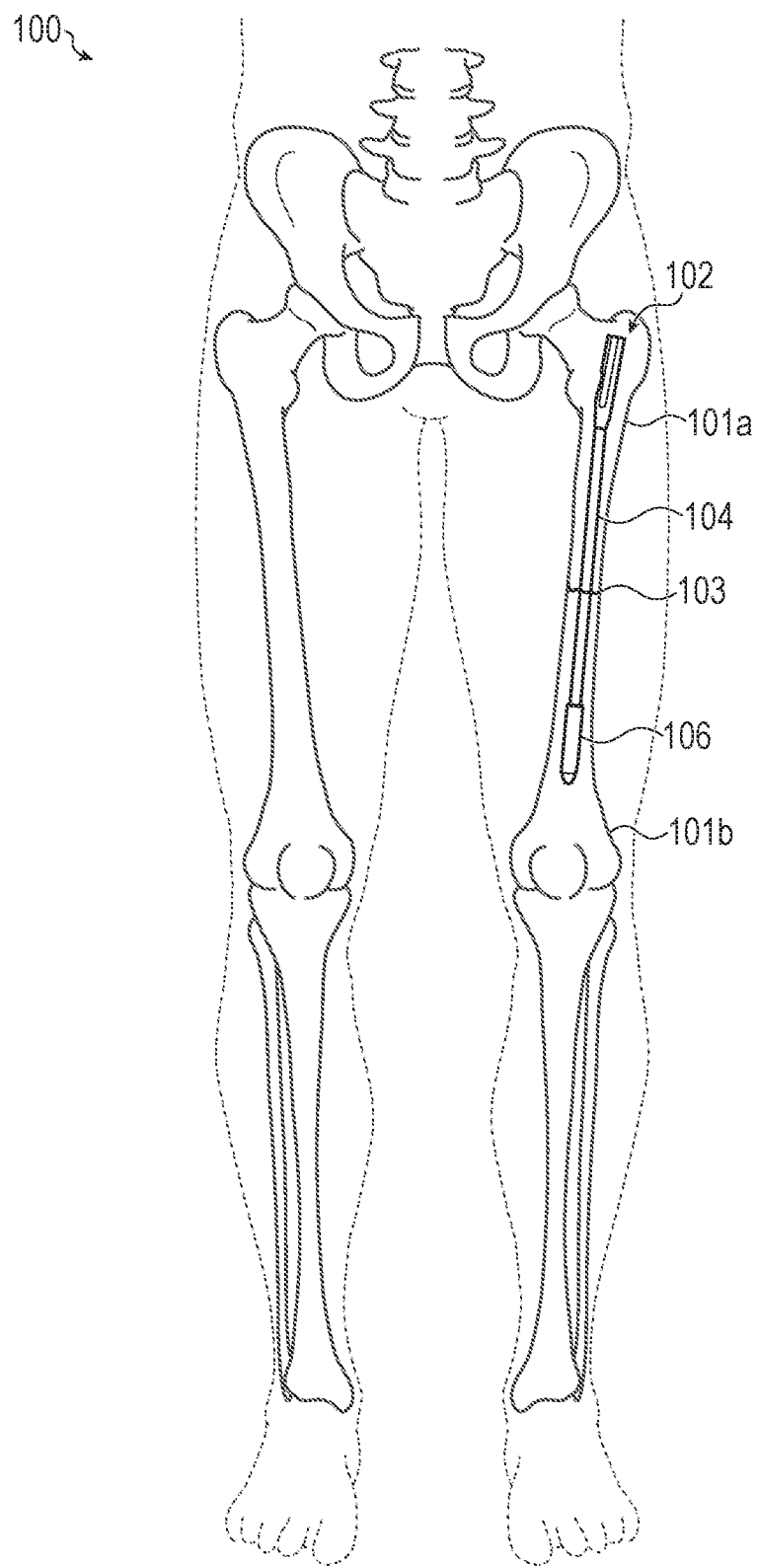
FIG. 1B shows an example of the femoral nail in a second configuration in which a portion of the nail has been rotated to stabilize a distal portion of the femur in a second rotational position.

After the femoral nail 102 is secured to the femur 101, the femoral nail 102 can be adjusted to change an alignment of the first femur portion 101a with respect to the second femur portion 101b. A lock, described herein and located on the femoral nail 102, can be disengaged to allow the collar to move with respect to the shaft 104. Once the lock is disengaged, the second femur portion 101b can be repositioned/realigned with respect to the first femur portion 101a. FIG. 1B shows an example of the femur 101 in a second configuration in which the second femur portion 101b has been rotated with respect to the first femur portion 101a. Once a desired alignment of the first and second femur portions 101a, 101b is achieved, the lock can be engaged to fix the collar 106 to the shaft 104 to prevent movement of the first femur portion 101a with respect to the second femur portion 101b. Accordingly, the femoral nail 102 may be adjusted after it is initially secured to the bone to change an alignment of a lower portion of the leg with respect to an upper portion of the leg, such as a hip joint.

In some cases, the initial placement of a rigid femoral nail may result in a misalignment of the lower portion of the leg to a hip joint or other anatomy. For example, the knee may be rotated inward or outward as compared to its position before the fracture. This type of misalignment may result in short and/or long term problems, such as changes to a user's gait, increased wear one or more joints, and/or other issues due to improper alignment of the femur portions after a fracture. The femoral nail system described herein may help reduce these and/or other issues by allowing for repositioning of the femur portions after the femoral nail 102 has been secured to the bone. In some cases, this repositioning may occur during the same surgical procedure as when the femoral nail 102 was secured to the femur 101 or during a separate procedure at a later time.

Figure 2:
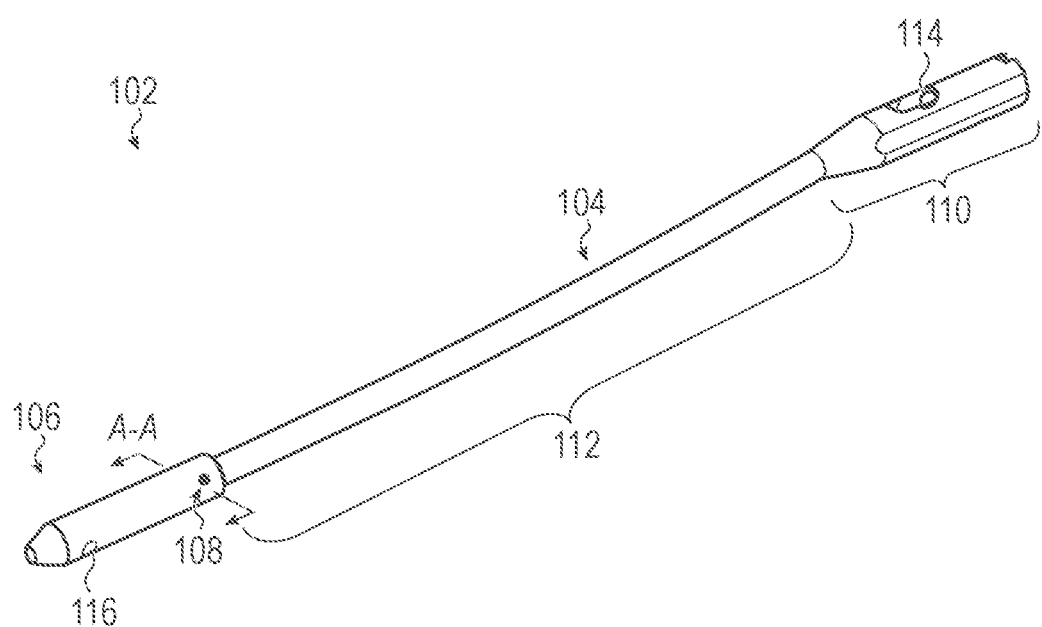
FIG. 2 shows an example of a femoral nail.

FIG. 2 shows an example of the femoral nail 102. The femoral nail 102 can include the shaft 104, the collar 106, and a lock 108. The shaft 104 can extend from a first end to a second end. The shaft 104 can include a head portion 110 and a body portion 112. In some cases, the head portion 110 can include features for inserting the femoral nail 102 into the femur, such as features that couple the femoral nail 102 to an insertion tool and/or allow the femoral nail to be driven into the intramedullary. In some cases, an outer dimension of the head portion, such as a diameter and/or cross-section area, can be larger than an outer diameter of the body portion 112. For example, the head portion 110 may have a greater cross-sectional area for driving the femoral nail 102 into the intramedullary and/or to facilitate coupling of the femoral nail 102 to an insertion and/or alignment tool as described herein.

In some cases, the shaft 104 can include a curve along at least a portion of its length dimension. For example, the body portion 112 and/or the head portion 110 can be curved to mimic the natural anatomy of the femur, which may help position the femoral nail along a central portion of the femur. Additionally or alternatively, the collar 106 can include a curve that is the same as or is different from a curve of the shaft 104.

In some cases, the shaft 104 can define one or more openings 114 (one of which is shown for clarity) that are configured to accept an orthopedic screw. An orthopedic screw can be inserted through the one or more of the openings 114 to couple the shaft 104 to a first portion of the femur. In some cases, the one or more openings 114 may be located at an end of the shaft 104, for example along the head portion 110. In other cases, openings can be located along different portions of the shaft 104, for example a first opening can be in the head portion 110 and a second opening can be in the body portion 112.

The collar 106 can couple to the shaft in a variety of ways, as described herein. The collar 106 can include one or more openings 116 (one of which is labeled for clarity) that are configured to accept an orthopedic screw to couple to the collar 106 to a second portion of the femur. In some examples, an end portion of the collar 106 can be configured to fit over an end portion of the shaft 104, as illustrated in FIG. 2. In other cases, an end portion of the shaft 104 can be configured to fit over an end portion of the collar 106.

The collar 106 can move with respect to the shaft 104. In some cases, the collar 106 can rotate with respect to the shaft 104, which can allow changes to the rotational alignment of a first femur portion coupled to the shaft 104 with respect to a second femur portion coupled to the collar 106. Additionally or alternatively, the collar 106 can move in an axial direction with respect to the shaft, which can allow a length of the femoral nail 102 to be increased.

In some cases, the lock 108 can be positioned in the collar 106 and engage with the shaft 104 to prevent movement of the collar 106 with respect to the shaft 104. For example, the lock can include a set screw, pin, or other structure (collectively referred to herein as a "set screw") that is positioned in the collar 106. In a first state, the set screw does not contact the shaft 104 or contacts the shaft 104 with a low force that allows movement of the collar 106 with respect to the shaft 104 by a surgeon. In a second state, the set screw can be engaged to contact the shaft 104 with a force that prevents movement of the collar 106 with respect to the shaft 104. In the second state, the force of the locking mechanism (e.g., set screw on the shaft 104) may be sufficient to prevent relative movement of the collar 106 and the shaft 104 under typical loads that would be applied to the femoral nail 102 during and/or after a healing period.

Additionally or alternatively, the head portion 110 can move with respect to the body portion 112. For example, the head portion 110 may rotate with respect to the body portion 112, which can allow for rotational changes to a proximal portion of the femur. Rotational of the head portion 110 may be used in cases where the femur (or other bone) is fractured in multiple parts to help facilitate alignment of the multiple fractured sections. In yet, other cases, the collar 106 can be positioned at the head portion 110 of the femoral nail 102.

The shaft 104, the collar 106, and/or the lock 108 can be formed from suitable biocompatible materials such as titanium, stainless steel, other suitable alloys, polymer materials, such as polyether ether keytone (PEEK), composite materials, and/or the like, and/or combinations thereof.

In some case, the femoral nail 102 can be different sizes and different sizes of the femoral nail 102 may be used to treat fractures in different locations and/or selected based on a size and/or anatomy of a patient. For example, the overall length of the femoral nail 102 can be increased or decreased, for example by increasing and/or decreasing the respective lengths of the shaft 104 and/or the collar 106. Additionally, the relative proportions of the shaft 104 and the collar 106 shown in the figures are provided as examples, and the relative proportions of the shaft 104 and the collar 106 can be different from those shown.

Figure 3A:
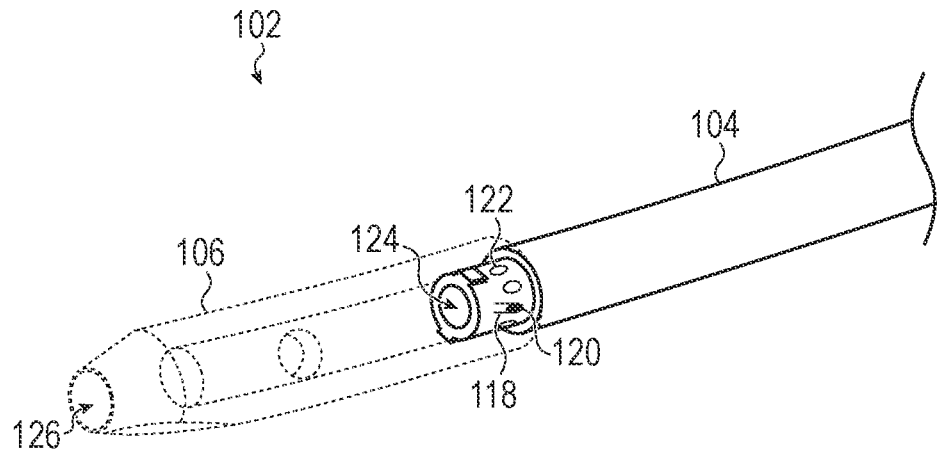
FIG. 3A shows a detailed view of a distal portion of an example femoral nail with its collar in phantom view.

FIG. 3A shows a detailed view of a distal portion of the femoral nail 102, with the collar 106 shown in fantom. In some cases, the lock 108 (FIG. 2) can include a threaded hole 118 on collar 106 and a threaded fastener 120 that couples with the threaded hole 118. The threaded fastener 120 can engage with the shaft 104 to prevent movement between the shaft 104 and the collar 106. In some cases, the shaft 104 can include one or more recesses 122 (one of which is labeled for clarity) and a portion of the threaded fastener 120 may be positioned within a recess 122 as the threaded fastener 120 is advanced in the threaded hole 118. This may provide a further mechanical interference that prevents movement of the collar 106 with respect to the shaft 104 and may increase the amount of force that resists this relative movement. In some cases, the threaded hole 118 and the threaded fastener 120 can be replaced with a sliding pin mechanism such as an unthreaded hole and a pin that slides within this hole to engage with the shaft (e.g., slide into a recess 122 on the shaft). In some cases, this pin mechanism can include a spring that biases the pin to move into one of the recesses 122. The examples described herein are given in the context of the threaded fastener and/or pin being coupled to the collar 106 and engaging and disengaging with the shaft 104. However, in other cases, the threaded fastener and/or pin can be coupled to the shaft 104 and engage with the collar 106, for example in cases where an end of the shaft 104 is positioned over an end of the collar 106.

In other cases, multiple threaded fasteners 120 can be used, which may increase the amount of force required to move the collar 106 with respect to the shaft 104 when the lock is engaged. In yet other examples, other locking mechanisms can be used, such as a ball detent mechanism. In further examples, the lock can include a gear-type mechanism in which the shaft 104 and the collar 106 can each include a set a teeth that mesh together to prevent relative movement of these components. The collar 106 and shaft 104 can be moved apart along an axial direction to disengage the teeth to rotate these components, and then moved back together to re-engage the teeth to prevent further movement.

The shaft 104 can have an opening 124 the extends through a length of the shaft 104, and the collar 106 can have an opening 126 the extends through a length of the collar 106. The opening 124 in the shaft 104 can align with the opening 126 in the collar 106 when the shaft 104 and collar 106 are coupled together. The openings 124, 126 can facilitate the insertion of the femoral nail 102 over a guidewire or other structure that is used to insert the femoral nail 102 into the femur.

Figure 3B:
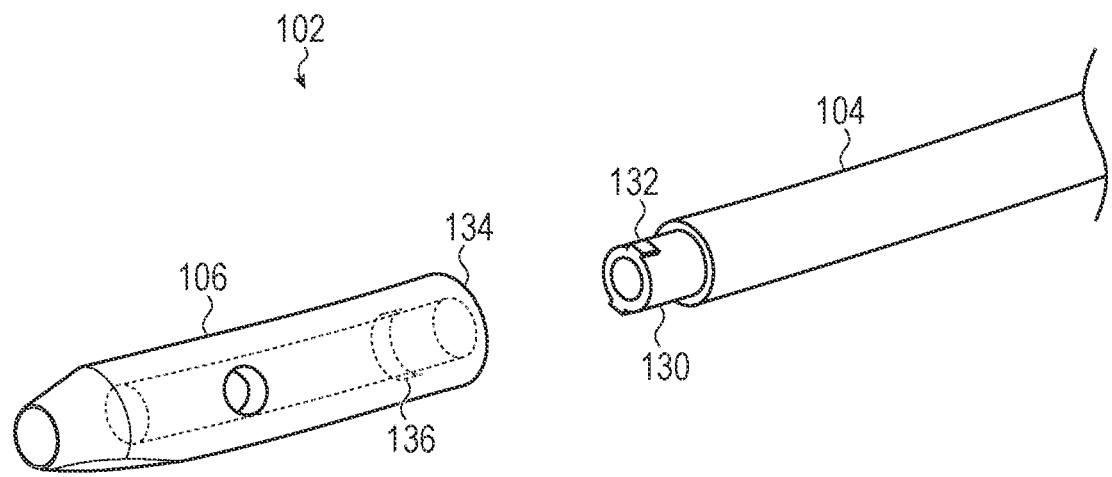
FIG. 3B shows an exploded view of a distal portion of the femoral nail with a portion of the collar in phantom view.

FIG. 3B shows an exploded view of the distal portion of the femoral nail 102, with a portion of the collar 106 shown in phantom. The shaft 104 can have a first retention feature 132 positioned proximate to an end 130 of the shaft 104. In some cases, the first retention feature 132 can include a projection from the end 130. The collar 106 can have a second retention feature 136 positioned proximate to an end 134 of the collar 106. The first retention feature 132 can engage with the second retention feature 136 to couple the collar 106 to the shaft 104. The first and second retention feature 132, 136 can allow relative movement between the shaft 104 and the collar 106 while preventing the shaft 104 and collar 106 from decoupling. In some cases, the first and second retention features 132, 136 can allow the collar 106 to rotate with respect to the shaft 104. For example, the first retention feature 132 can be a projection defined by an outer surface of the shaft 104, and the second retention feature 136 can be a channel defined by an inner surface of the collar 106. The projection can be positioned within the channel to define a rotational movement profile between the shaft 104 and the collar 106.

Additionally or alternatively, the first and second retention features 132, 136 can define other movement profiles between the shaft 104 and the collar 106. For example, the channel can be configured to allow axial movement between the shaft 104 and the collar 106, which can allow a length of the femoral nail to be increased or decreased.

Figure 4:
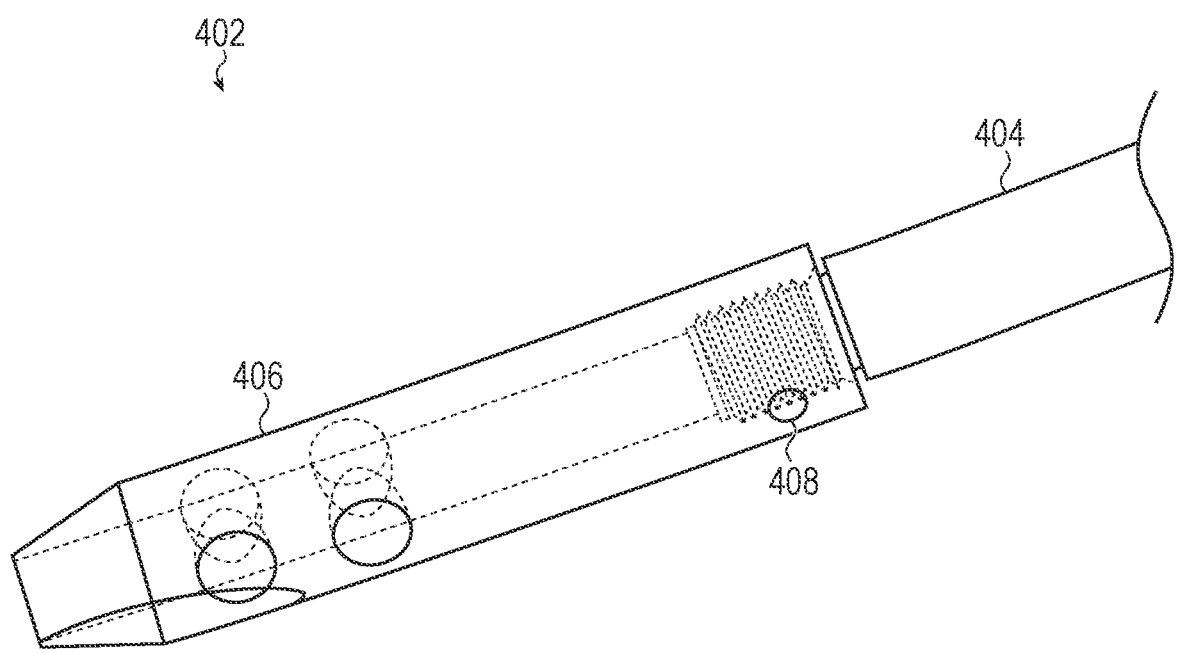
FIG. 4 shows a detailed view of a distal portion of an example femoral nail.

FIG. 4 shows a detailed view of a distal portion of an example femoral nail 402. The femoral nail 402 can be an example of the femoral nails described herein (e.g., femoral nail 102). The femoral nail 402 can include a shaft 404 and a collar 406, which can be examples of the shafts and collars described herein. The femoral nail 402 can include retention features that include a threaded coupling. For example, an end of the shaft 404 can define a first threaded feature that engages with a second threaded feature defined by the collar 406. The first and second threaded features can allow changes in a rotational orientation of the collar 406 with respect to the shaft 404. Additionally, the first and second threaded features can change a length of the femoral nail 402. For example, rotation of the collar 406 or the shaft 404 in a first direction can increase a length of the femoral nail 402 and rotation in the other direction can decrease a length of the femoral nail 402.

The femoral nail 402 can include a lock 408, which can be an example of the locks described herein (e.g., locks 108). In some cases, the lock can include a threaded fastener that engages with a threaded hole(s) in the collar 406 and/or the shaft 404, as described herein. In some cases, the shaft 404 or the collar 406 can include one or more recesses and the threaded fastener can be positioned within the recess to prevent relative movement of the shaft 404 and the collar 406, as described herein.

Figure 5:
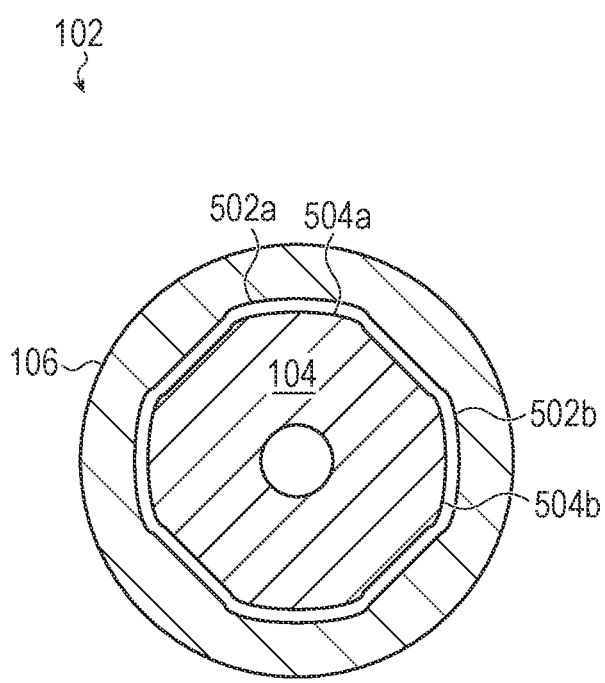
FIG. 5 shows an example of a femoral nail in cross-section, illustrating a sample rotational alignment mechanism.

FIG. 5 is a cross-sectional view taken along plane A-A of FIG. 2 that shows an example of a rotational alignment mechanism for the femoral nail 102. In some cases, the femoral nail 102 can include an alignment feature that biases the shaft 104 and the collar 106 into one or more defined rotational alignment positions. The alignment feature may allow the collar 106 or shaft 104 to be rotated by defined angular rotations, which may help a user when performing an alignment procedure on a fractured femur.

In some cases, an outer surface of the collar 106 can define one or more recesses 502 (two of which are labeled for clarity) along an end portion of the collar 106. The shaft 104 can define one or more lobes 504 (two of which are labeled for clarity) along an end portion of the shaft 104. Each lobe 504 can engage with a different recess 502 to define an angular relation of the collar 106 with respect to the shaft 104. The dimensions and shape of the lobes 504 and recesses 502 can be configured such to allow rotation of the collar 106 and/or shaft 104, while biasing toward engagement of the lobe 504 within a recess 502. For example, in a first orientation, a first lobe 504a is biased to be positioned within a first recess 502a and a second lobe 504b is biased to be positioned within a second recess 502b to set a first angular orientation of the shaft 104 and the collar 106. As the shaft 104 and/or the collar 106 is rotated, the first lobe 504a can move the second recess 502b to set a second angular orientation of the shaft 104 and the collar 106.

Four sets of lobes and recesses are shown as an illustrative example, and the femoral nail 102 can include more or less lobes and/or recesses. Further, the number of lobes does not need to match the number of recesses. For example, the collar 106 can have a greater or fewer number of recesses than the number of lobes on the shaft 104. In some cases, the lobes 504 can be located on the collar 106, and the recesses 502 can be located on the shaft 104. In other cases, the shaft 104 and collar 106 can each comprise lobes and recesses that form complementary pairs.

In some cases, the lobes 504 and/or recess 502 can be configured at predefined angular rotations. For example, each rotation of a lobe 504 from a first recess and to a second adjacent recess can be defined angular rotation (e.g., 5 degrees, 10 degrees and so on). In some cases, the lobes 504 and recess 502 can be configured to provide feedback to the user. For example, the lobes 504 may click as they are seated in a new recess 502, which may be heard and/or felt by the user. The combination of the defined angular increments and the "click" type (or other) feedback may allow a user to track the amount of rotation of the collar 106 with respect to the shaft 104 without seeing the femoral nail 102 and/or needing to use a measurement tool.

In some cases, the collar 106 and/or the shaft 104 can include radiographic markings, which may be viewed by x-ray or other imagining technique while the femoral nail 102 is inserted in a patient. These radiographic markings may be used to measure and/or track a relative position of the collar 106 with respect to the shaft 104.

Figure 6:
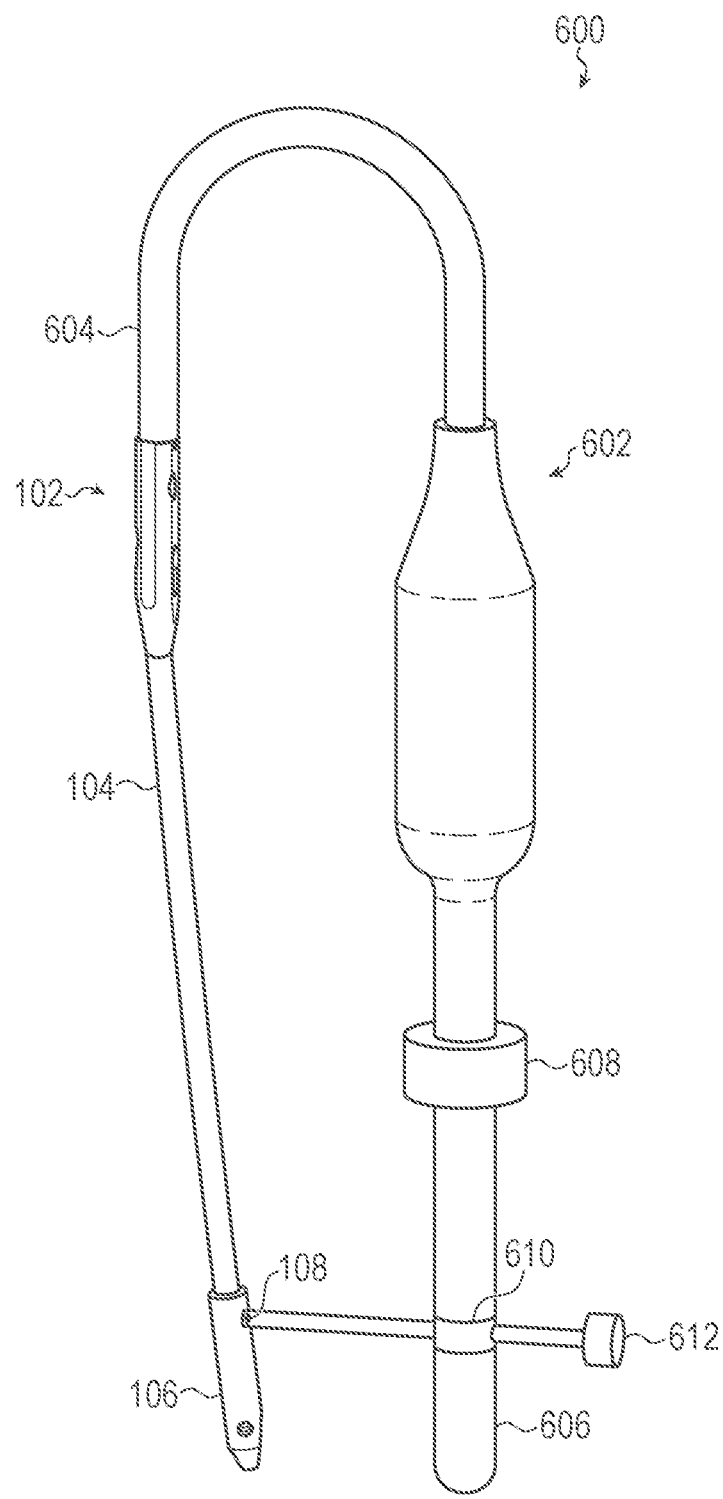
FIG. 6 shows an example of a femoral nail system including an alignment tool for setting a rotational alignment of a femoral nail.

FIG. 6 shows an example of a femoral nail system 600 including an alignment tool 602 for setting alignment of the femoral nail 102. As described herein, the position of the collar 106 with respect to the shaft 104 can be changed after the femoral nail 102 has been secured to the femur. The alignment tool 602 can be used to set the relative position (e.g., rotational and/or axial) of the shaft 104 and the collar 106.

The alignment tool 602 can include a first portion 604 that is coupled to a second portion 606 by a joint 608. The joint 608 can allow the first portion 604 to move in a defined profile with respect to the second portion 606. For example, the joint 608 can facilitate movement such that the first portion 604 remains aligned with the shaft 104 and the second portion 606 remains aligned with the collar 106 as it rotates with respect to the shaft 104. The first portion 604 can couple to the femoral nail 102. For example, an end of the shaft 104 can have a first feature that couples with an end of the first portion 604. The second portion 606 can include a guide 610 that aligns with the lock 108 on the femoral nail 102. The alignment tool 602 can include a key 612 that couples with the guide 610. The key 612 can engage and/or disengage the lock 108. For example, the key 612 can engage the lock 108 to prevent rotation of the collar 106 with respect to the shaft 104 and/or disengage the lock 108 to allow rotation of the collar 106 with respect to the shaft 104, as described herein.

When a user (e.g., surgeon) is going to change the orientation of a first femur portion to a second femur portion, the user can couple the first portion 604 to the shaft 104. The joint 608 can be set to align the guide 610 and the key 612 to the lock 108, while the femoral nail is secured within the intramedullary of the femur. Once aligned, the key 612 can be operated to disengage the lock 108, thereby allowing rotation between the collar 106 and the shaft 104. In some cases, the key 612 can remain engaged with the lock while the surgeon changes an orientation of a first femur portion with respect to a second femur portion. Accordingly, the key 612 may cause the second portion 606 to move as the femur alignment is adjusted, and this change in orientation can be indicated by the joint 608. For example, the joint 608 can include a gauge that indicates a rotational orientation of the collar 106 with respect to the shaft 104. Once the desired orientation of the first and second femur portions is achieved, the key 612 can be operated to engage the lock 108 and prevent movement between the collar 106 and the shaft 104.

Additionally or alternatively, the femoral nail 102 and the alignment tool 602 can be configured to set other movement profiles in addition to rotational movement between the shaft 104 and the collar 106. For example, the collar 106 may be able to move in an axial direction with respect to the shaft 104 to change a length of the femoral nail 102. Accordingly, the alignment tool 602 can be configured to have a movement profile that tracks this axial movement to align the key 612 with the lock 108.

Figure 7:
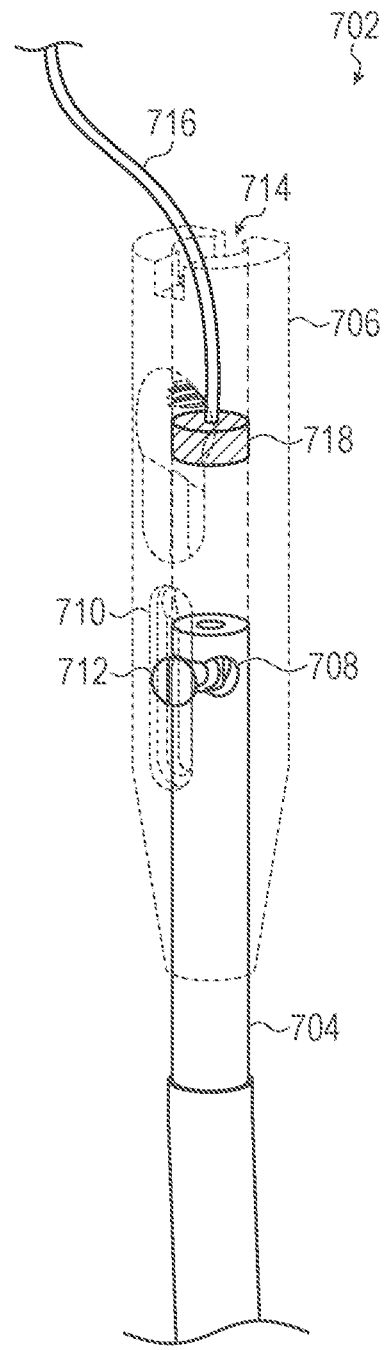
FIG. 7 shows an example femoral nail that can be used to rotate and/or distract a fractured bone.

FIG. 7 shows a detailed view of a proximal portion of a femoral nail 702 that can be used to rotate and/or translate a fractured bone. In the example shown in FIG. 7, a collar 706 is located at a proximal end of the femoral nail 702 and would be positioned proximal to the head of the femur and a shaft 704 would extend into the femur toward the patella.

The shaft 704 can define a first opening 708 that extends along the shaft 704 in a first direction. For example, as shown in FIG. 7, the first opening 708 extends along a radial direction of the shaft 704. In other cases, the first opening 708 can extend along an axial direction of the shaft 704. In yet other examples, the first opening 708 may extend diagonally (e.g., both axially and radially along the shaft). The collar 706 can define a second opening 710 the extends along the collar 706 in a second direction. For example, as shown in FIG. 7, the second opening 710 extends along an axial direction of the collar 706. In other cases, the second opening 710 can along a radial direction of the collar 706 (e.g., when the first opening extends axially along the shaft 704). In other examples, the second opening may extend in other directions, such as diagonally along the collar 706.

The femoral nail 702 can include a cam lock 712 that extends through the first opening 708 and the second opening 710 and selectively fixes the shaft 704 and the collar 706. For example, in a first state (e.g., an unlocked position), the cam lock 712 may allow the collar 706 to move with respect to the shaft 704 and in a second state (e.g., a locked position), the cam lock 712 may statically couple the collar 706 to the shaft 704 to prevent movement between the collar 706 and the shaft 704. In some cases, the cam lock 712 can be a single body. The cam lock 712 may include one or more features, such as an abutment under the head of the cam lock 712 and/or located at an end of the cam lock 712, and when the cam lock 812 is rotated, the abutment can cause the cam lock 812 to compress the collar 706 and the shaft together 704. In some cases, the collar 706 and/or the shaft 704 may define mating features that help prevent movement between the collar 706 and the shaft 704 when the cam lock 712 is engaged. In some cases, the cam lock 712 can be configured with a defined amount of rotation between the locked and unlocked positions. For example, a 90 degree rotation can cause the cam lock 712 to lock and lock the collar 706 and the shaft 704 and another 90 degree rotation, in the same and/or opposite direction, can cause the cam lock to unlock and allow movement between the collar 706 and the shaft 704.

The shape of the first opening 708, the shape of the second opening 710 and the cam lock 712 can define the movement profile between the shaft 704 and the collar 706. For example, as shown in FIG. 7, the cam lock 712 can move radially along the first opening 708, which allows the collar 706 to rotate with respect to the shaft 704. Additionally, the cam lock 712 can move axially along the second opening 710, which allows the collar 706 to move axially with respect to the shaft 704 (e.g., the length of the nail 702 can be extended or shortened). Accordingly, the movement profile defined by the first and second openings 708, 710 and the cam lock 712 can allow for rotation and/or axial movement of the collar 706 with respect to the shaft 704. In other cases, the first and/or second openings 708, 710 can define any suitable profiles that defines the movement profile between the shaft 704 and the collar 706.

In some cases, the femoral nail 702 may be extended to separate segments of a bone prior to rotating the bone segments. For example, in cases where the end segments of the bone prevent rotation, the femoral nail 702 may be extended to separate the bone segments, which can allow the bone segments to be rotated. After the bone segments are repositioned, the segments may be held in the new orientation by locking the cam lock 12. Additionally or alternatively, the femoral nail 702 can be used to achieve a desired a length of the bone. For example, the femoral nail 702 may be extended, and in some cases rotated, by unlocking the cam lock 712. After being repositioned, the cam lock 712 can be locked to the fix the collar 706 and shaft 704 in the new configuration. In some cases, when a fracture occurs the bone may become compressed and/or parts of bone at the fracture may separate which can cause the bone to shorten if the bone segments are brought back together. Accordingly, the femoral nail 702 may allow for distraction of the bone where the broken segments can be positioned to achieve the original bone length and/or a desired bone length (e.g., making the bone longer).

In some cases, the length and/or shape of the first opening 708 and/or the second opening 710 can be configured to define a maximum elongation or rotation of the femoral nail 702. Additionally or alternatively the first and/or second openings 708, 710 and/or the cam lock 712 can include features that define incremental elongation and/or rotation amounts. For example, the first and/or second openings 708, 710 can include recesses that the cam lock 712 can slide into, which may set defined axial movement increments and/or rotational movement increments.

An end 714 of the collar 706 can include features for inserting, positioning or otherwise manipulating the femoral nail 702. In some cases, these can include threaded features that engage with an alignment and/or insertion tool as described herein. For example, the threaded features can be used to mount the femoral nail 702 on an alignment tool, which may be used to change a rotational or axial alignment of the collar 706 with respect to the shaft 704 as described herein. In some cases, the features on the end 712 of the collar 706 can include one or more slots and the alignment tool may engage with the slot while the collar 706 and the shaft 704 are rotated and/or elongated.

In some cases, a guide wire 716 can be used to help locate and coupled an handle to the femoral nail 702. The guide wire 716 may be coupled to an anchor 718 that can selectively couple the guide wired 716 to the femoral nail 702. The anchor 718 may include any suitable mechanism that can temporarily secure the guide wire 716 to the femoral nail 702. For example, the anchor 718 may include an inflatable chamber the expands against the inner wall of the femoral nail 702, may include threaded features that engage with threads in the femoral nail 702, and so on. The guide wire 716 may extend from the femoral nail 702, when the nail is inserted in a bone, and outside the patient. A handle, an alignment tool or other tool can engage with the guide wire to help couple the handle to the femoral nail 702, which it is inserted in the patient.

Figure 8:
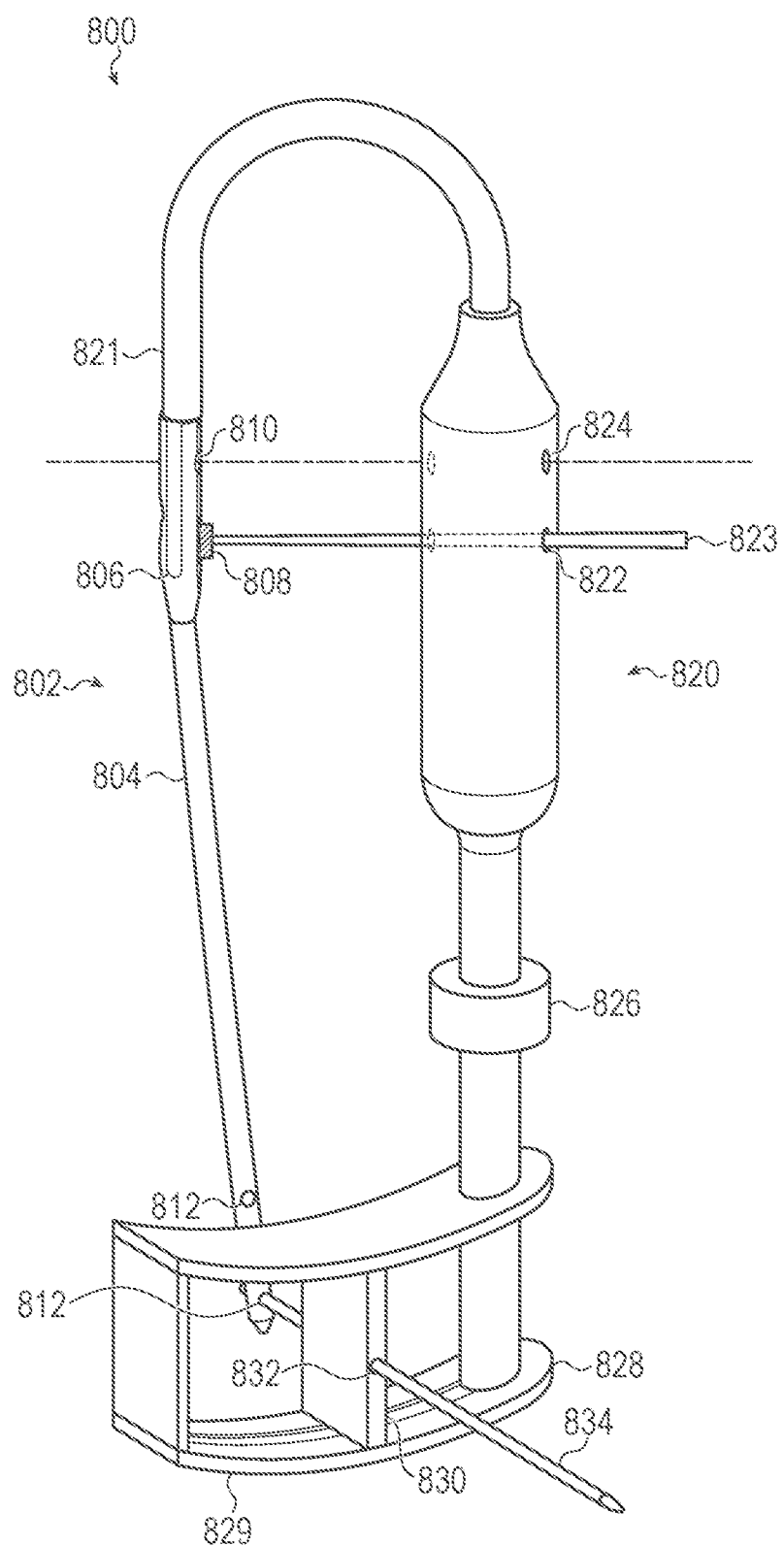
FIG. 8 shows an example of a femoral nail system including an alignment tool for controlling rotation and distraction of a fracture bone.

FIG. 8 shows an example of a femoral nail system 800 including an example femoral nail 802 and an alignment tool 820 for controlling rotation and distraction of a fractured bone. The femoral nail 802 can be an example of the femoral nails described herein and include a shaft 704, a collar 806 and a lock 808 (e.g., cam lock 812) that selectively locks the shaft 704 and the collar 706.

The alignment tool 820 can be an example of the alignment tools described herein. The alignment tool 820 can be used to locate one or more features on the femoral nail 802 including the lock 808, one or more orthopedic screw openings 810, and/or orthopedic screws that have been inserted into the screw openings 810. The alignment tool 820 can also be used to control and/or measure movement of a first bone segment (e.g., coupled to the shaft 804) with respect to a second bone segment (e.g., coupled to the collar 806).

The alignment tool 820 can include a first end 821 that couples to an end of the femoral nail 802. The first end 821 can couple using any suitable technique including threaded fasteners, a features that engages with a slot on the end of the femoral nail 802, and so on. The alignment tool 802 can include a first opening 822 that aligns a locking tool 823 to the lock 808. For example, when the alignment tool 820 is coupled to the femoral nail 802, the locking tool 823 may be inserted through the first opening 822, which aligns the locking tool 823 to the lock 808. Additionally or alternatively, the lock 808 may include features that help locate the lock 808 during an orthopedic procedure. For example, the lock may include materials that show up on radiographic images and can be configured to extend at least partially from the outer surface of the femoral nail 802 such that a position of the lock 808 can be identified using standard radiographic imaging techniques. The alignment tool 820 can also include one or more second openings 824 which can align with the orthopedic screw openings 810 on the femoral nail 802.

In some cases, the alignment tool 820 can include a bracket 828 and slide 830 that can measure and/or control rotation between the shaft 204 and the collar 206. For example, the slide 830 may be configured to move along a path defined by the bracket 828. An alignment member 834 may couple to the slide 830 (e.g., extend through opening 832) and couple to a screw opening 812 and/or an orthopedic screw positioned within the screw opening 812. Movement of the slide 830 along the frame 828 may correspond to rotation of the shaft 804 about an axis of the femoral nail 802. In some cases, the bracket 828 may include markings 829 that indicate an amount of rotation of the shaft 804 with respect to the collar 806. The bracket 828 can be located outside of a patient while the orthopedic nail is positioned within the bone of the patient. Accordingly, the position of the slide 832 with respect to the markings 289 can indicate an amount of rotation of the shaft 804 with respect to the collar 806.

In other cases, other suitable techniques, such as a laser light source, may be used to indicate an amount of rotation between the shaft 804 and the collar 806. For example, a laser light source can be coupled to the alignment member 834 and may project onto a target that includes a rotation scale, which may be coupled to a non-moving portion of the alignment device 820. As the shaft 804 (and bone segment coupled to the shaft 804) is rotated laser light projected by the laser light source may move along the target indicating the amount of rotation. The bracket 828 and the slide 834 can be configured to allow rotation in either direction (e.g., anterograde or retrograde rotation of the bone segment attached to the shaft 804).

Additionally or alternatively, the alignment device 820 can be configured to measure and/or control axial movement between the shaft 804 and the collar 806. The alignment device 820 can include an axial control 826, which can be operated to increase a length of the femoral nail 802. For example, the shaft 804 may be coupled to a bottom portion of the alignment tool 820 (e.g., using alignment member 834, slide 830 and bracket 828) and the collar 806 may be coupled to an upper portion of the alignment tool (e.g., the first end 821). The axial control 826 may be used to increase a distance between the bottom portion and the upper portion of the alignment tool 820. For example, the axial control 826 may include a threaded component that when turned causes a distance between the upper portion and the lower portion of the alignment tool 820 to increase thereby increasing a length of the femoral nail 802 by moving the shaft 804 along the collar 806, as described herein. The change in length of the femoral nail 802 may be indicated by the axial control 826 and/or measured using a laser light source to measure an increase in distance from a target or other suitable technique. Accordingly, the alignment device 820 can allow both rotation and axial movement between the shaft 804 and the collar 806.

Figure 9:
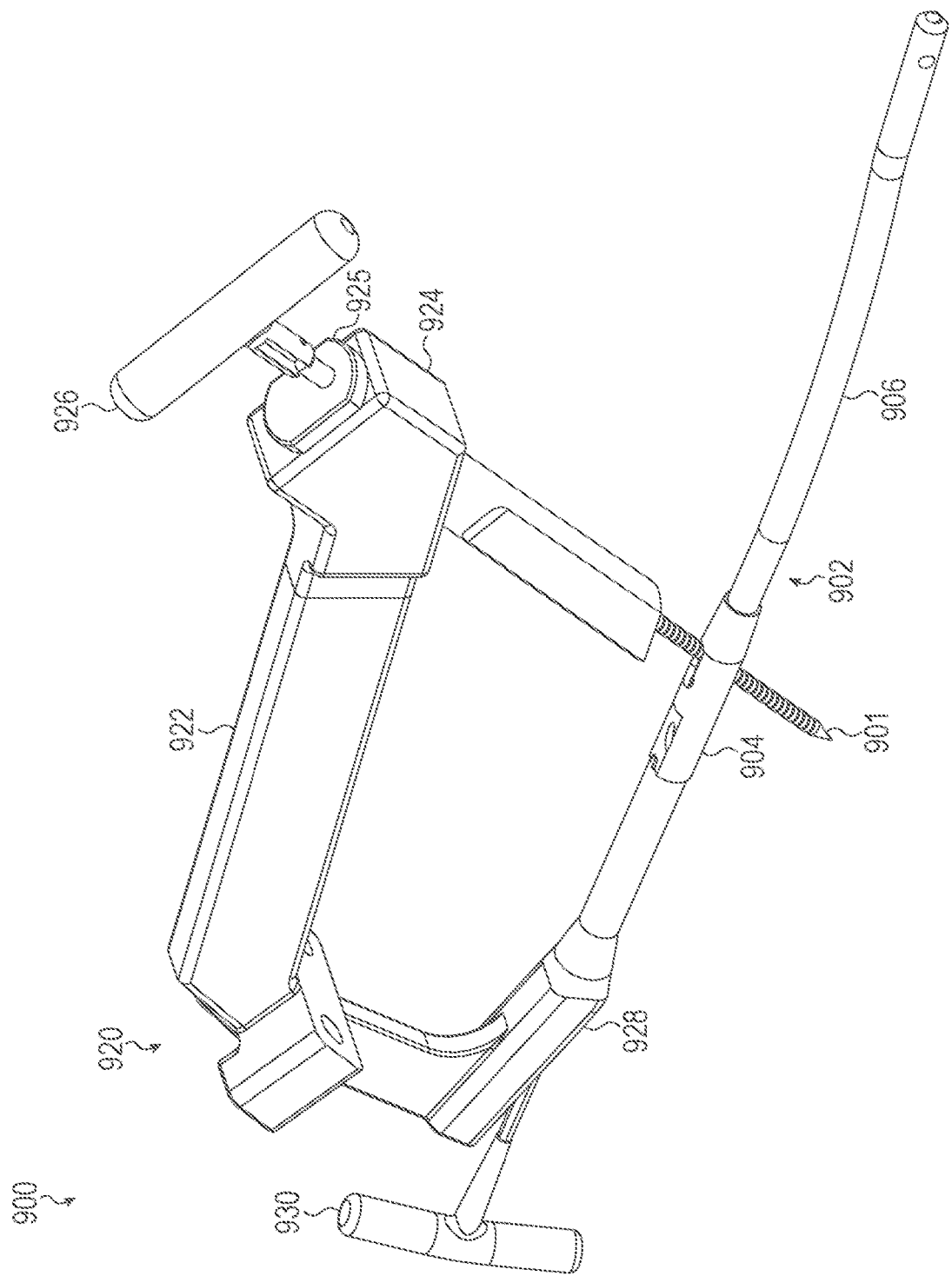
FIG. 9 shows an example of a femoral nail system that can be used to control rotation and/or distraction using a tool that engages with a proximal end of the femoral nail.

FIG. 9 shows an example of a femoral nail system 900 that can be used to control rotation and/or distraction of a bone using a tool that engages with a proximal end of the femoral nail. The femoral nail system 900 is an example of the femoral nail systems described herein and includes a femoral nail 902 and an alignment tool 920. The femoral nail 902 can be an example of the femoral nails described herein and includes a collar 904 that can be selectively rotated and/or translated with respect to a shaft 906. The alignment tool 920 is an example of the alignment tools described herein (e.g., alignment tools 602 and 820). The alignment tool 920 can be used to locate one or more features on the femoral nail 902 including a locking mechanism 908 (shown in FIG. 10), one or more orthopedic screw openings, and/or orthopedic screws that have been inserted into the screw openings. The alignment tool 920 can also be used to control and/or measure movement of a first bone segment (e.g., coupled to a shaft 906) with respect to a second bone segment (e.g., coupled to a collar 904).

The alignment tool 920 includes a handle portion 922, a first alignment feature 924 and a second alignment feature 928. The first alignment feature 924 may be configured to align one or more tools with one or more openings in the femoral nail 902 and/or an orthopedic fastener. For example, the first alignment feature 924 may be configured to align an orthopedic driving tool 926 and/or orthopedic screw (e.g., orthopedic screw 901) with an opening in the femoral nail 902. In some cases, the first alignment feature 924 may define an opening that is configured to directly align an orthopedic tool with the femoral nail 902 or accept an adapter 925 that can be placed in the alignment feature and the adapter can interface with the orthopedic tool (e.g., driving tool 926). In some cases, the first alignment feature 924 may be configured to accept different adapters 925 which may interface with different orthopedic tools.

The second alignment feature 928 is configured to align one or more orthopedic tools with a distal end of the femoral nail 902. For example, the femoral nail 902 may include a locking mechanism that is located at the collar 904 of the femoral nail 902. The second alignment feature 928 may align a locking tool 930 along an axis of the collar 904 and with a locking mechanism (shown in FIG. 10) that interfaces with the collar 904. Accordingly, the alignment tool 920 may allow the locking mechanism of the femoral nail 902 to be accessed by a locking tool 930 along an axial direction of the femoral nail 902 and at a proximal end of the femoral nail 902.

The second alignment feature 928 may couple to a distal end of the femoral nail (e.g., the collar 904) as described herein and define an opening that aligns the locking tool 930 with the collar 904. The locking tool 930 may be inserted through the opening to access the locking mechanism at the collar 904. In some cases, the alignment feature 928 may be configured to accept one or more adapters that can be sintered into the alignment feature 928 and interface with the locking tool 930.

The alignment tool 920 can be configured to measure rotation and/or distraction between the collar 904 and the shaft 906, as described herein. For example, a rotational measurement device such as a goniometer can be attached to the alignment tool and indicate an amount of rotation of the collar 904 with respect to the shaft 906. In some cases, a laser light source, may be used to indicate an amount of rotation between the collar 904 and the shaft 906. For example, a laser source can mounted to a portion of the alignment tool 920 that is fixed to the collar 904. A rotation indicator may be fixed to a the shaft 906. The laser source may direct a light toward the rotation indicator to indicate an initial rotation value on rotation indicator. As the a portion of the bone attached to the shaft 906 is rotated, the rotation indicator may rotate with respect to the laser source and the laser light may indicate a second rotation value. Additionally or alternatively, the laser source may be used to measure a distance to the rotation indicator. Changes in the length of the femoral nail 902 to increase, used to extract the bone, may be determined from changes in distance to the rotation indicator measured by the laser.

Figure 10:
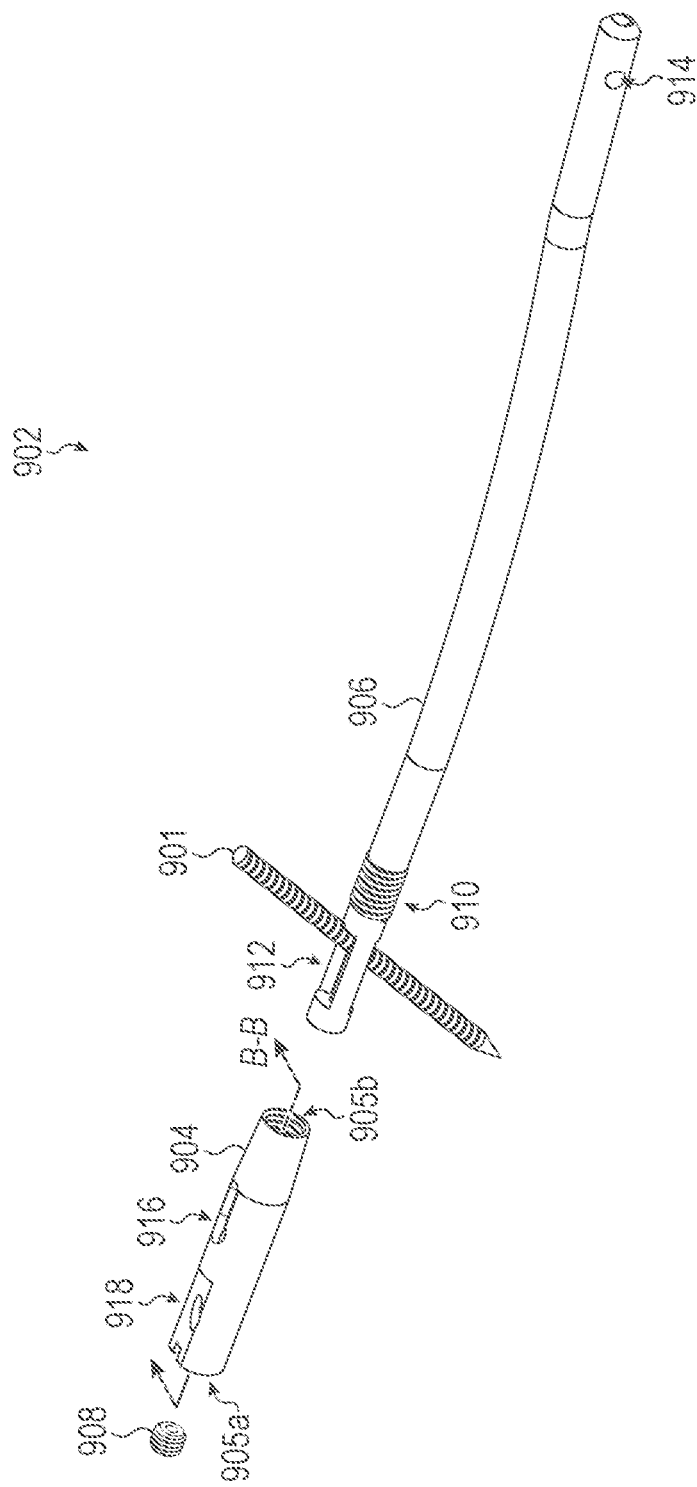
FIG. 10 shows an example of a femoral nail including a locking mechanism that can be accessed through the proximal end of the femoral nail.

FIG. 10 shows an exploded view of an example of a femoral nail 902 including a locking mechanism 908 that can be accessed through a proximal end of the femoral nail 902. In the example femoral nail 902, the collar 904 may be located at a proximal to a hip joint and the shaft 906 may be configured to extend along the femur toward a distal end of the femur (e.g., toward a knee joint). The locking mechanism 908 can be configured to selectively allow rotation and/or translation between the collar 904 and the shaft 906, as described herein. For example, when the locking mechanism is engaged, it may fix the collar 904 with respect to the shaft to prevent movement between the collar 904 and the shaft 906 (e.g., rotational and/or translation movement). When the locking mechanism is disengaged, it may allow the collar 904 to rotate with respect to the shaft 906 and/or allow the collar 904 to be translated with respect to the shaft 906 to change the axial length of the femoral nail 902.

In some cases, the locking mechanism 908 may include a threaded fastener that screws into a first end 905a of the collar 904. The shaft 906 may include a threaded portion 910 that screws into a second end 905b of the collar 904. The locking mechanism 908 may be engaged (e.g., rotated in a first direction within the collar 904) to contact the end of the shaft 906 thereby generating forces the lock the threaded portion 910 of the shaft 906 to complimentary threads on the collar 904. The forces generated by the locking mechanism 908 can prevent movement of the collar 904 with respect to the shaft 906. When the locking mechanism 908 is disengaged from the end of the shaft 906 (e.g., rotated in a second, opposite direction within the shaft 904), the forces may be reduced and the collar 904 may be rotated with respect to the shaft 906.

The shaft 906 may define one or more openings that are configured to accept an orthopedic fastener. For example the shaft 906 may defined a first opening 912. When the shaft 906 is coupled to the collar 904, the first opening 912 may align with a second opening 916 defined by the collar 904. Accordingly, when the shaft 906 is coupled to the collar 904, the orthopedic fastener 901 may extend through the first opening 912 and the second opening 916. The first opening 912 may be configured to allow rotation and/or distraction of the shaft 906 with respect to the collar 904 while the orthopedic fastener is positioned within the first opening 912 and the second opening 916. The second opening 916 may be configured so that the orthopedic fastener rigidly couples the collar 904 to a first portion of a fractured bone. A third opening 914 may be configured to so that an orthopedic faster rigidly coupled the shaft 906 to a second portion of a fractured bone, as described herein. Accordingly, when the locking mechanism is disengaged, the collar 904 (and first portion of the fractured bone) may be rotated with respect to the shaft 906 (and second portion of the fractured bone).

Additional or alternatively, the collar 904 may include one or more additional openings 918 that can interface with one or more additional orthopedic fasteners to fix the collar 904 to a bone (e.g., the first portion of a fractured bone). The shaft 906 may also include one or more additional openings that can interface with one or more additional orthopedic fasteners to fix the shaft 906 to a bone (e.g., the second portion of the fractured bone).

Figure 11:
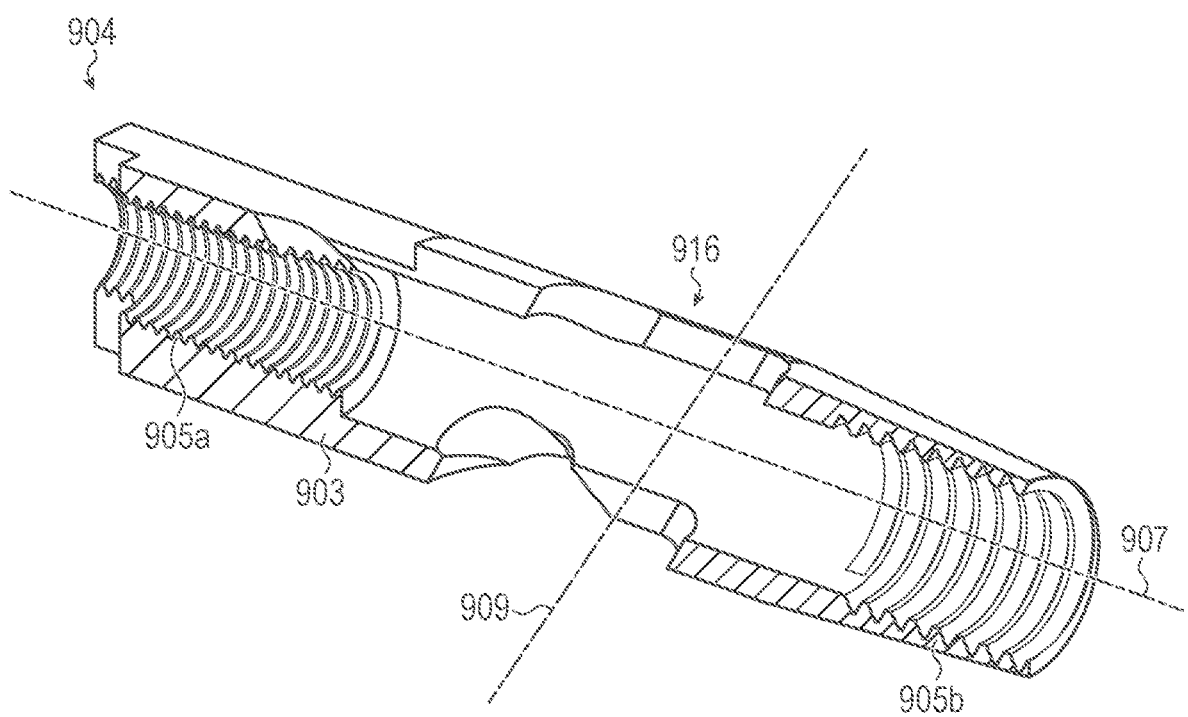
FIG. 11 shows a cross-sectional view of a collar of the femoral nail shown in FIG. 10.

FIG. 11 shows a cross-sectional view of a collar 904 of the femoral nail 902 taken along line B-B shown in FIG. 10. In some cases, the first end 905a of the collar 904 may define a first set of engagement features (e.g., threaded features) that engage with the locking mechanism 908. The second end 905b of the collar 904 may defined a second set of engagement features (e.g., second threaded features) that engage with the threaded portion 910 of the shaft 906. The threaded features are provide as an example, and the collar 904, shaft 906 and/or locking mechanism may include other features that allow the femoral nail 902 to selectively rotate and/or translate as described herein. For example, the second end 905b of the collar 904 may define a set of lobed features and the shaft 906 may include a complimentary set of lobed features that allow rotation in defined increments. In this example, retaining feature (e.g., snap ring, ledge, and so on) may be used to allow the locking mechanism 904 to generate an axial force and lock the collar 904 to the shaft 906.

The collar 904 may include a side wall 903 that defines a first opening extending along a first axis 907, which may be oriented along a longitudinal axis of the collar 904. In some cases, the first set of engagement features and the second set of engagement features may be formed on an inner surface of the side wall 903. Further, first set of engagement features and the second set of engagement features may the same or different from each other. For example the second set of engagement features (e.g., threaded features formed at the second end 905b) may be configured to cause a defined amount of translation for each rotational increment, which may be used to change a length of the nail, when the collar 904 is rotated with respect to the shaft. The first set of engagement features (e.g., threaded features formed at the first end 905a) may be configured to allow a defined amount of rotation to cause the collar 904 to lock to the shaft 906 and/or be unlocked from the shaft.

The second opening 916 may extend through the collar 904 (e.g., the sidewall) along a second axis or direction 909 that is non-parallel to the first axis 907. In some cases, the second axis 909 may be orthogonal to the first axis 907, and in other cases the second axis 909 may be at a non-orthogonal angle with respect to the first axis 907.

Figure 12:
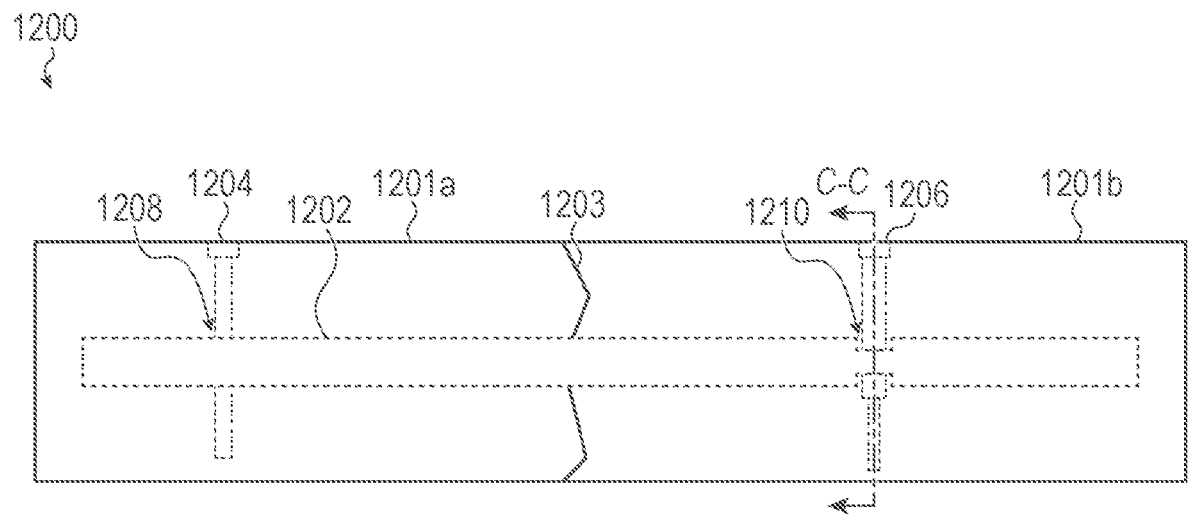
FIG. 12 shows a simplified schematic view of an example of a femoral nail system that allows rotation of a bone after placement of the nail.

FIG. 12 shows a simplified schematic view an example of a femoral nail system 1200 that allows relative rotation of a bone around the nail after placement of the nail. The femoral nail system 1200 can include a femoral nail 1202 that is configured to be placed in a bone 1201, as described herein. The bone 1201 may have a fracture 2103 that separates the bone 1201 into a first bone segment 1201a and a second bone segment 1201b. The fracture 1203 may be the result of trauma or a surgical fracture that is induced to adjust the alignment of the first and second bone portions 1201a and 1201b as described herein.

The femoral nail 1202 can be a rigid structure that is configured to be inserted into a bone and extend along a length of the bone 1201. A first orthopedic fastener 1204 may engage with a first opening 1208 in the femoral nail to rigidly fix the femoral nail 1202 to the first bone segment 1201a. The femoral nail 1202 may include a second opening 1210. A second orthopedic fastener 1206 may engage with the femoral nail 1202 at the second opening 1210 to fix rigidly fix the femoral nail 1202 to the second bone segment. The second orthopedic fastener can be disengaged from the femoral nail 1202 to allow the second bone segment 1201b and the second orthopedic fastener 1206 to be rotated relative to the femoral nail 1202. The second orthopedic fastener 1202 may be disengaged from the nail and remain rigidly fixed to the second bone segment 1201b during the rotation. Once the first and second bone segments 1201a and 1201b are in a desired orientation, the second orthopedic fastener 1206 may be engaged with the femoral nail 1202 at the second opening 1210 to rigidly fix the second bone segment 1201b back to the femoral nail 1202.

Figure 13A:
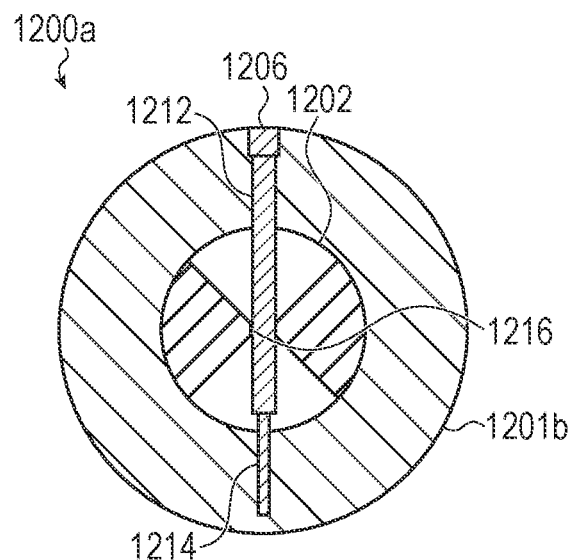
FIGS. 13A-13D show a set of example cross-section views of the femoral nail system shown in FIG. 12.

FIGS. 13A-13D are a set of example cross-section views taken along line C-C of the femoral nail system shown in FIG. 12. Initially FIG. 13A is discussed.

Figure 13B:
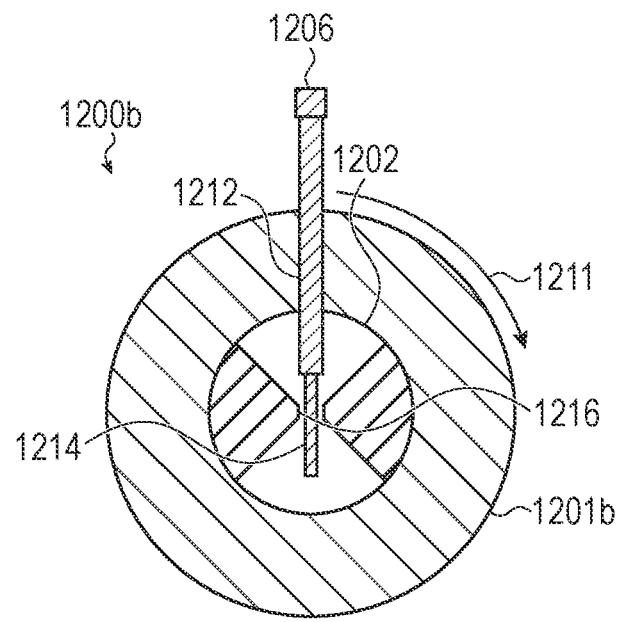

FIG. 13A depicts the femoral nail system 1200a in a first state after the femoral nail 1202 has been inserted into a bone and the femoral nail 1202 is rigidly fixed to first bone segment 1201a via the first orthopedic fastener 1204 and rigidly fixed to the second bone segment 1201b via the second orthopedic fastener 1206. The second orthopedic fastener 1206 includes a first segment 1212 that has a larger cross-section and first set of threaded features and a second segment 1214 that has a smaller cross-section and a second set of threaded features. The orthopedic nail 1202 includes an anchor structure 1216 at the second opening 1210. In the first state, the first segment 1212 may engage with the anchor structure 1216 and the second bone segment 1201b to rigidly fixed the femoral nail 1202 to the second bone segment 1201b. In this configuration the femoral nail 1202 prevents movement between the first bone segment 1201a and the second bone segment 1201b. Threaded structures on the first segment 1212 may engage with the anchor structure 1216 to rigidly fix the femoral nail 1202 to the second orthopedic fastener 1206 and to the second bone segment 1201b. For example, the threaded structures on the first segment 1212 may cutting or otherwise deform the anchor structure 1216, FIG. 13B depicts the femoral nail system 1200b at a second state that disengages the second orthopedic fastener 1206 from the femoral nail 1202. For example, the femoral nail 1202 may be partially removed (e.g., unscrewed) so that the first segment 1212 disengages from the anchor structure 1216. In the second state, the second orthopedic fastener 1206 may remain rigidly fixed to the second bone segment 1201b, and the second segment 1214 may be positioned within the anchor structure 1216. The partial removal of the second orthopedic fastener 1206 may allow the second bone segment 1201b and the second orthopedic fastener to be rotated (e.g., in direction 1211) with respect to the femoral nail 1202 and the first bone segment 1201a (still rigidly coupled to the femoral nail 1202 by the first orthopedic fastener 1204). For example, the smaller cross-section of the second segment 1214 may be positioned within the anchor structure 1216 but not engage with the anchor structure 1216.

Figure 13C:
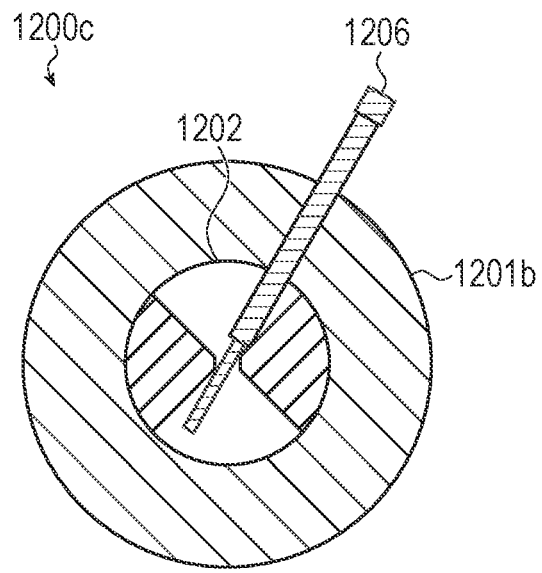

FIG. 13C depicts the femoral nail system 1200c at a third state after the second bone segment 1201b and the second orthopedic fastener 1206 have been rotated with respect to the femoral nail 1202 and the first bone segment 1201b. After achieving a desired rotational orientation between the first bone segment 1201a and the second bone segment 1201b, the second orthopedic fastener 1206 may be reengaged with the femoral nail 1202. When the second orthopedic fastener 1206 is reengaged, the first segment 1212 (e.g., threads on the first segment) may engage with the anchor structure 1216 in a different orientation from the first state shown in 1200a.

Figure 13D:
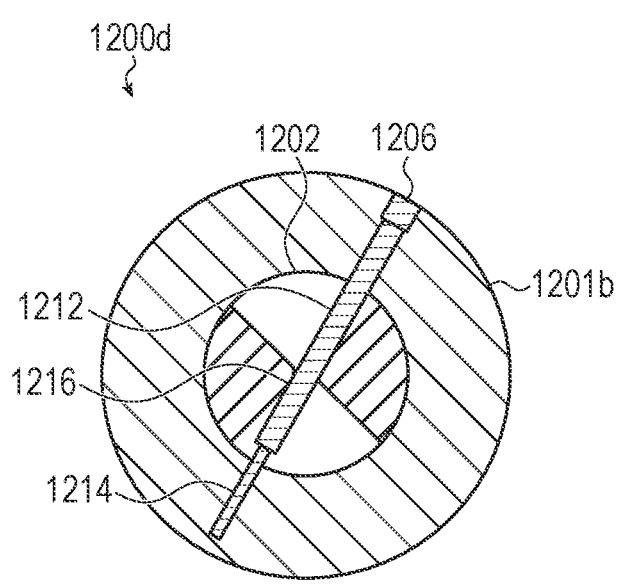

FIG. 13D shows an example of the femoral nail system 1200d in a fourth state after the second orthopedic fastener 1206 has been reengaged into the second bone segment 1201b. The second orthopedic fastener 1206 may fix the femoral nail 1202 to the second bone segment 1201b in the new orientation. For example, threads on the second segment may cut, deform or otherwise engage with the anchor structure 1216 to rigidly fix the femoral nail 1202 to the second orthopedic fastener 1206 and the second bone segment 1201b.

The femoral nail 1202 and second orthopedic fastener 1206 may be formed from any suitable materials including metals, composites, polymer materials, and so on, as described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An orthopedic nail, comprising:
  a collar comprising a sidewall extending from a first end to a second end and defining:
    a first opening extending from the first end to the second end along a first axis of the collar;
    a second opening configured to engage with an orthopedic fastener;
    first engagement features positioned at the first end of the first opening; and
    second engagement features positioned at a second end of the first opening;
  a shaft extending from a first end to a second end and defining:
    a third opening positioned adjacent to the first end of the shaft and configured to allow the orthopedic fastener to pass through the shaft; and
    third engagement features positioned between the third opening and a second end of the shaft, and configured to rotationally couple to the second engagement features, wherein when the third engagement features are coupled to the second engagement features the first end of the shaft is positioned in the first opening of the collar and the third opening is aligned with the second opening; and a locking mechanism configured to:
be accessed when the orthopedic nail has been positioned within a person and coupled to a bone with the orthopedic fastener;
couple to the first engagement features;
in a first state, prevent rotation of the collar with respect to the shaft; and
in a second state, allow rotation of the collar with respect to the shaft when the orthopedic nail is positioned within the person and coupled to the bone.

2. The orthopedic nail of claim 1, wherein:
the collar is configured to be positioned proximal to a hip joint when the orthopedic nail is positioned within a femur; and
the first axis of the collar is configured to extend along a length of the femur when the orthopedic nail is positioned within the femur.

3. The orthopedic nail of claim 1, wherein:
the locking mechanism comprises a threaded fastener that is configured to rotate about the first axis;
rotation of the locking mechanism in a first direction cause the locking mechanism to contact the shaft and rigidly fix the collar with respect to the shaft; and
rotation of the locking mechanism in a second direction caused the locking mechanism to disengage from the shaft and allow movement of the collar with respect to the shaft.

4. The orthopedic nail of claim 1, wherein when the locking mechanism is in the second state, the third opening is configured to allow rotation of the collar with respect to the shaft when an orthopedic fastener extends through second and third openings.

5. The orthopedic nail of claim 4, wherein:
the second opening is configured to rigidly couple the collar to a first bone segment when an orthopedic fastener is engaged with the first opening; and
the shaft comprises a fourth opening configured to rigidly couple the shaft to a second bone segment when an orthopedic fastener is engaged with the fourth opening.

6. The orthopedic nail of claim 4, wherein when the locking mechanism is in the second state, the third opening is configured to allow translation movement between the collar and the shaft to change a length of the orthopedic nail.

7. The orthopedic nail of claim 1, wherein:
the second engagement features comprise first threaded features positioned on an inner surface of the sidewall; and
the third engagement features comprising second threaded features positioned on an outer surface of the shaft.

8. The orthopedic nail of claim 1, wherein the shaft comprises a curve along at least a portion of a length dimension.

9. An orthopedic fixation device, comprising:
a collar extending along an axis from a first end to a second end and defining;
first engagement features positioned at the first end;
second engagement features positioned at the second end; and
a first opening extending through a side of the collar and configured to allow an orthopedic fastener to extend through the collar;

a shaft extending from a first end to a second end and defining;
third engagement features configured to engage with the second engagement features to couple the shaft to the collar and allow the shaft to rotate with respect to the collar; and
a second opening positioned proximate to the first end and configured to align with the first opening, wherein the orthopedic fastener is configured to rotate within the second opening when the shaft is rotated with respect to the collar; and
a locking mechanism configured to engage with the first engagement features and the shaft to selectively prevent rotation of the collar with respect to the shaft.

10. The orthopedic fixation device of claim 9, wherein:
the first opening is configured to engage with a first orthopedic fastener to rigidly couple the collar to a first bone segment; and
the second opening is configured to allow the first orthopedic fastener to extend through the shaft.

11. The orthopedic fixation device of claim 10, wherein the shaft defines a third opening configured to engage with a second orthopedic fastener to rigidly couple the shaft to a second bone segment.

12. The orthopedic fixation device of claim 9, wherein:
the collar is further configured to be translated with respect to the shaft to change a length of the orthopedic fixation device; and
the locking mechanism is configured to selectively prevent translation of the collar with respect to the shaft to fix the length of the orthopedic fixation device.

13. The orthopedic fixation device of claim 9, wherein:
the locking mechanism comprises a threaded faster that engages with the first engagement features; and
the locking mechanism is configured to rotate between a first state and a second state with respect to the collar.

14. The orthopedic fixation device of claim 13, wherein:
in the first state the locking mechanism is configured to allow the collar to rotate and translate with respect to the shaft; and
in the second state the locking mechanism is configured to prevent movement of the collar with respect to the shaft.

15. The orthopedic fixation device of claim 9, wherein the first end of the shaft is configured to be positioned within the collar when the shaft is coupled to the collar.

16. An orthopedic fixation system comprising:
a nail comprising:
a collar defining:
first threaded engagement features;
second threaded engagement features; and
a first opening configured to couple with an orthopedic screw;
a shaft configured to couple with the collar and rotate with respect to the collar, the shaft defining:
third engagement features configured to couple to the first engagement features and allow the shaft to rotate with respect to the collar;
a second opening that aligns with the first opening when the shaft is coupled to the collar; and
a lock that is configured to couple with the second threaded engagement features and contact the shaft to prevent rotation of the shaft with respect to the collar;

; and
   an alignment tool comprising:
      a first portion that couples to the first end of the collar
         the first portion configured to align an orthopedic fastening tool with the lock.

17. The orthopedic fixation system of claim 16, wherein:

rotation of the lock in a first direction cause the lock to prevent rotation of the collar with respect to the shaft; and rotation of the lock in a second direction allows rotation of the collar with respect to the shaft.

18. The orthopedic fixation system of claim 17, wherein the first portion comprises an opening that aligns the orthopedic fastening tool with the lock.

19. The orthopedic fixation system of claim 16, further comprising a gauge that indicates a rotational orientation of the collar with respect to the shaft.

20. The orthopedic fixation system of claim 19, wherein the gauge is mounted on the alignment tool.

\* \* \* \* \*